United States Patent
Yi et al.

(10) Patent No.: US 12,525,634 B2
(45) Date of Patent: Jan. 13, 2026

(54) FUEL CELL HEAT TREATMENT METHOD AND APPARATUS

(71) Applicants: Hyundai Motor Company, Seoul (KR); Kia Corporation, Seoul (KR)

(72) Inventors: Yil Hoon Yi, Busan (KR); Hyung Wook Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 704 days.

(21) Appl. No.: 17/891,561

(22) Filed: Aug. 19, 2022

(65) Prior Publication Data

US 2023/0282865 A1 Sep. 7, 2023

(30) Foreign Application Priority Data

Mar. 4, 2022 (KR) ........................ 10-2022-0028412

(51) Int. Cl.
| | |
|---|---|
| *H01M 8/2483* | (2016.01) |
| *H01M 8/0258* | (2016.01) |
| *H01M 8/0267* | (2016.01) |
| *H01M 8/04119* | (2016.01) |
| *H01M 8/1004* | (2016.01) |
| *H01M 8/248* | (2016.01) |

(52) U.S. Cl.
CPC ....... *H01M 8/2483* (2016.02); *H01M 8/0258* (2013.01); *H01M 8/0267* (2013.01); *H01M 8/04179* (2013.01); *H01M 8/1004* (2013.01); *H01M 8/248* (2013.01)

(58) Field of Classification Search
CPC ........................... H01M 2250/20; Y02E 60/50
See application file for complete search history.

(56) References Cited

U.S. PATENT DOCUMENTS

| | | | |
|---|---|---|---|
| 2004/0173608 A1* | 9/2004 | Seccombe, Jr. | ........ C21D 1/767 219/762 |
| 2005/0263393 A1* | 12/2005 | Paz | .................. H01M 8/04305 429/444 |
| 2013/0252119 A1* | 9/2013 | Gottmann | ............... H01M 8/00 429/535 |

FOREIGN PATENT DOCUMENTS

| | | |
|---|---|---|
| JP | 2001110439 A | 4/2001 |
| JP | 2007187398 A | 7/2007 |
| KR | 20060083375 A | 7/2006 |
| KR | 20100022362 A | 3/2010 |
| KR | 101000096 B1 | 12/2010 |
| KR | 101292256 B1 | 8/2013 |

(Continued)

OTHER PUBLICATIONS

Won et al., KR 101292256, Espacenet machine translation, 2013 (Year: 2013).*

*Primary Examiner* — Adam A Arciero
(74) *Attorney, Agent, or Firm* — Slater Matsil, LLP

(57) ABSTRACT

An embodiment fuel cell heat treatment method includes preparing a fuel cell stack by stacking a plurality of unit cells, each unit cell including a membrane electrode assembly, and performing a heat treatment on an entirety of the fuel cell stack at a preset target temperature in a heat treatment chamber. An embodiment fuel cell heat treatment apparatus includes a heat treatment chamber configured to perform a heat treatment on an entirety of a fuel cell stack at a preset target temperature in the heat treatment chamber, the fuel cell stack including a plurality of unit cells stacked on each other, each unit cell including a membrane electrode assembly.

20 Claims, 15 Drawing Sheets

(56) References Cited

FOREIGN PATENT DOCUMENTS

WO 2009064265 A1 5/2009

\* cited by examiner

FUEL CELL HEAT TREATMENT METHOD AND APPARATUS

CROSS-REFERENCE TO RELATED APPLICATIONS

This application claims the benefit of Korean Patent Application No. 10-2022-0028412, filed on Mar. 4, 2022, which application is hereby incorporated herein by reference.

TECHNICAL FIELD

Embodiments of the present disclosure relate to a fuel cell heat treatment method and apparatus.

BACKGROUND

A fuel cell stack refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may include a membrane electrode assembly (MEA) having an electrolyte membrane that allows hydrogen positive ions to move therethrough, and electrodes (catalyst electrode layers) provided on two opposite surfaces of the electrolyte membrane to enable a reaction between hydrogen and oxygen. The fuel cell may also include gas diffusion layers (GDLs) disposed to be in close contact with two opposite surfaces of the membrane electrode assembly and configured to distribute reactant gases and transfer the generated electrical energy, and separators (bipolar plates) disposed to be in close contact with the gas diffusion layers and configured to define flow paths.

The separators may include an anode separator configured to supply hydrogen which is fuel, and a cathode separator configured to supply air which is an oxidant. The separator includes channels through which the fuel or the oxidant flows.

The membrane electrode assembly may be manufactured in the form of a roll made by winding a stack in which electrodes (catalyst electrode layers) and gaskets are sequentially formed on two opposite surfaces of an electrolyte membrane. The membrane electrode assembly may be cut into pieces each corresponding to the fuel cell (unit cell) (cut into a size corresponding to the fuel cell).

Meanwhile, during a process of forming the electrodes on the two opposite surfaces of the electrolyte membrane, a dispersant (solvent) (e.g., alcohol) is used as a solvent to effectively disperse a catalyst (e.g., Pt) used to form the electrode on the surface of the electrolyte membrane (inhibit a situation in which the catalyst agglomerates). The dispersant remaining in the membrane electrode assembly degrades durability and reliability of the membrane electrode assembly and performance of the fuel cell stack. Therefore, it is necessary to remove the dispersant remaining in the membrane electrode assembly as much as possible.

In the related art, there has been proposed a method of removing the dispersant remaining in the membrane electrode assembly by performing heat treatment on the membrane electrode assembly before configuring the unit cell by using the membrane electrode assembly (before the fuel cell stack is fastened).

However, in the related art, a process of performing heat treatment on the membrane electrode assembly is performed in a state in which the membrane electrode assembly is wound in the form of a roll. For this reason, it is difficult to effectively remove the dispersant remaining on the surface of the electrolyte membrane. In particular, in the state in which the membrane electrode assembly is closely wound in the form of a roll, the electrolyte membrane is also wound in the form of a roll. Therefore, there is a problem in that it is difficult to ensure a sufficient space (gap) through which the dispersant remaining on the surface of the electrolyte membrane is removed (evaporated). For this reason, there is a problem in that the dispersant remains in the membrane electrode assembly even though the heat treatment process is performed on the membrane electrode assembly.

Therefore, recently, various studies have been conducted to minimize the amount of foreign substances (e.g., the dispersant) remaining in the membrane electrode assembly and improve durability and reliability, but the study results are still insufficient. Accordingly, there is a need to develop a technology to minimize the amount of foreign substances (e.g., the dispersant) remaining in the membrane electrode assembly and improve durability and reliability.

SUMMARY

Embodiments of the present disclosure relate to a fuel cell heat treatment method and apparatus. Particular embodiments relate to a fuel cell heat treatment method and apparatus that are capable of improving durability and reliability and minimizing a defect of a fuel cell and deterioration in performance.

Embodiments of the present disclosure provide a fuel cell heat treatment method and apparatus that are capable of improving durability and reliability and minimizing a defect of a fuel cell and deterioration in performance.

In particular, embodiments of the present disclosure can minimize the amount of foreign substances remaining in the membrane electrode assembly and improve efficiency in removing foreign substances.

Embodiments of the present disclosure can improve durability and reliability of the membrane electrode assembly and ensure performance of a fuel cell stack.

Embodiments of the present disclosure can simplify a process of manufacturing a fuel cell stack and reduce the time and cost required to manufacture the fuel cell stack.

Embodiments of the present disclosure can effectively remove foreign substances remaining in a membrane electrode assembly without damage to a fuel cell stack.

Among other things, embodiments of the present disclosure can effectively remove foreign substances remaining in a fuel cell stack without disassembling and reassembling the fuel cell stack.

The features achievable by the embodiments are not limited to the above-mentioned features, but also include features or effects that may be understood from the solutions or embodiments described below.

An exemplary embodiment of the present disclosure provides a fuel cell heat treatment apparatus including a heat treatment chamber configured to perform heat treatment on a fuel cell stack configured by stacking a plurality of unit cells each including a membrane electrode assembly (MEA), in which the heat treatment is performed on the entire fuel cell stack at a preset target temperature in the heat treatment chamber.

This is to improve durability and reliability and minimize a defect of the fuel cell and deterioration in performance.

That is, in the related art, the heat treatment needs to be performed on the membrane electrode assembly to remove foreign substances (e.g., a dispersant) remaining in the membrane electrode assembly. However, in the related art, the process of performing heat treatment on the membrane electrode assembly is performed in a state in which the membrane electrode assembly is wound in the form of a roll. For this reason, it is difficult to effectively remove the dispersant remaining on the surface of the electrolyte membrane. That is, in the state in which the membrane electrode assembly is closely wound in the form of a roll, the electrolyte membrane is also wound in the form of a roll. Therefore, there is a problem in that it is difficult to ensure a sufficient space (gap) through which the dispersant remaining on the surface of the electrolyte membrane is removed (evaporated). For this reason, there is a problem in that the dispersant remains in the membrane electrode assembly even though the heat treatment process is performed on the membrane electrode assembly.

In contrast, according to the embodiments of the present disclosure, the heat treatment is not performed on the membrane electrode assembly wound in the form of a roll, in order to remove foreign substances (e.g., a dispersant) remaining in the membrane electrode assembly. Instead, the heat treatment is performed on the entire fuel cell stack including the membrane electrode assembly cut into pieces each corresponding to the unit cell. Therefore, it is possible to obtain an advantageous effect of minimizing the amount of foreign substances remaining in the membrane electrode assembly and improving efficiency in removing foreign substances.

In particular, in the fuel cell stack configured by staking the separators and the membrane electrode assemblies cut into pieces each corresponding to the unit cell, it is possible to ensure a sufficient space (e.g., pores in the gas diffusion layer and channels in the separator) in which foreign substances may move between the membrane electrode assemblies and the separators. Therefore, it is possible to obtain an advantageous effect of further improving efficiency in removing foreign substances by means of heat treatment.

Moreover, according to the embodiments of the present disclosure, the heat treatment may be performed on the entire defective fuel cell stack (the fuel cell stack including the membrane electrode assembly in which foreign substances remain) in the heat treatment chamber when foreign substances remain in the membrane electrode assembly included in the fuel cell stack. Therefore, it is possible to regenerate the defective fuel cell stack without inconvenience of having to disassemble or reassemble the fuel cell stack.

According to an exemplary embodiment of the present disclosure, the fuel cell heat treatment apparatus may include a fastening unit configured to fasten the fuel cell stack so that a temporary fastening pressure lower than a preset reference fastening pressure is applied to the unit cells while the heat treatment is performed on the fuel cell stack in the heat treatment chamber.

This is based on the fact that during the process of performing the heat treatment on the fuel cell stack, the membrane electrode assembly is heated and the other components (e.g., the separator, the gasket, and the gas diffusion layer), which constitute the fuel cell stack, are also heated and expanded simultaneously, and thus a particular component (e.g., the gas diffusion layer) among the components constituting the fuel cell stack may be damaged and deformed in the state in which the respective unit cells are maximally in close contact with one another (when the reference fastening pressure is applied) because the components (e.g., the separator and the gas diffusion layer) constituting the fuel cell stack have different coefficients of thermal expansion.

However, according to the embodiments of the present disclosure, during the process of performing the heat treatment on the fuel cell stack, the temporary fastening pressure lower than the reference fastening pressure may be applied to the unit cells, such that the intervals between the unit cells are increased (the unit cells are disposed at maximum cell pitch intervals). Therefore, it is possible to ensure a sufficient space (interval) in which the components constituting the fuel cell stack may be expanded without being damaged. Therefore, it is possible to obtain an advantageous effect of minimizing deformation and damage caused by the difference in coefficient of thermal expansion between the components.

According to an exemplary embodiment of the present disclosure, the fuel cell stack may include endplates configured to cover ends of the unit cells disposed at outermost peripheries among the plurality of unit cells and having target fluid inlet/outlet holes through which target fluids flow in or out, and the temporary fastening pressure may be applied to the endplate.

The fastening unit may have various structures capable of applying the temporary fastening pressure lower than the reference fastening pressure to the unit cells.

According to an exemplary embodiment of the present disclosure, the fastening unit may include a clamp member configured to surround peripheries of the unit cells and having one end and the other end respectively locked to the endplates.

According to an exemplary embodiment of the present disclosure, the fastening unit may include a weight member configured to apply a load, which corresponds to the temporary fastening pressure, to the endplate in a gravitational direction.

According to an exemplary embodiment of the present disclosure, the fastening unit may include a support portion configured to support the endplate disposed at one end of the plurality of unit cells, a guide portion connected to a lateral end of the support portion and configured to guide lateral sides of the unit cells, and a pressing portion disposed on the guide portion and configured to be rectilinearly movable in a direction in which the unit cells are stacked, the pressing portion being configured to selectively press the endplate disposed at the other end of the plurality of unit cells.

As described above, according to an embodiment of the present disclosure, the upper surface of the fuel cell stack may be pressed by the pressing portion in the state in which the bottom surface and the lateral surface of the fuel cell stack are supported by the support portion and the guide portion. Therefore, it is possible to obtain an advantageous effect of more stably maintaining the arrangement state (aligned state) of the unit cells and inhibiting the separation of the unit cells during the process of performing heat treatment on the fuel cell stack.

According to an exemplary embodiment of the present disclosure, the fuel cell heat treatment apparatus may include a stand configured to support the fuel cell stack so that the fuel cell stack is spaced apart from a bottom of the heat treatment chamber, and the stand may support the fuel cell stack so that the target fluid inlet/outlet holes are exposed.

As described above, according to an embodiment of the present disclosure, the stand may allow the fuel cell stack to be spaced apart from the heat treatment chamber without being in close contact with the heat treatment chamber, such that the target fluid inlet/outlet holes are kept in an opened state without being closed by the heat treatment chamber. Therefore, it is possible to obtain an advantageous effect of stably ensuring efficiency in discharging foreign substances (e.g., a dispersant) through the target fluid inlet/outlet holes during the process of performing heat treatment on the fuel cell stack.

According to an exemplary embodiment of the present disclosure, the fuel cell heat treatment apparatus may include an inclined seating portion provided on the stand and configured such that the fuel cell stack is inclinedly seated on the inclined seating portion.

As described above, according to an embodiment of the present disclosure, the fuel cell stack may be disposed to be inclined in the heat treatment chamber, such that foreign substances (e.g., the coolant) remaining in the fuel cell stack may naturally flow downward along the inclination of the fuel cell stack (the inclination of the inclined seating portion) during the process of performing heat treatment on the fuel cell stack. Therefore, it is possible to obtain an advantageous effect of further improving efficiency in discharging foreign substances.

The posture and arrangement structure of the fuel cell stack in the heat treatment chamber may be variously changed in accordance with required conditions and design specifications.

According to an exemplary embodiment of the present disclosure, in a step of performing heat treatment on the fuel cell stack in the heat treatment chamber, the fuel cell stack may be disposed in the heat treatment chamber such that the target fluid inlet/outlet holes are directed in a gravitational direction.

As described above, according to an embodiment of the present disclosure, the target fluid inlet/outlet holes of the fuel cell stack may be directed in the gravitational direction. Therefore, it is possible to minimize a situation in which the foreign substance or the coolant, which is evaporated from the membrane electrode assembly, passes through a reaction region, and then flows into a manifold flow path, comes into contact with the manifold flow path during the process of performing heat treatment on the fuel cell stack. Therefore, it is possible to obtain an advantageous effect of shortening the time required to discharge the foreign substances and the coolant and further improving discharge efficiency.

According to an exemplary embodiment of the present disclosure, the fuel cell heat treatment apparatus may include a cover member configured to cover the target fluid inlet/outlet holes, and the cover member may have a through-hole having a smaller cross-sectional area than the target fluid inlet/outlet hole and configured to communicate with the target fluid inlet/outlet hole.

With the above-mentioned structure, during the process of performing heat treatment on the fuel cell stack in the heat treatment chamber, foreign substances remaining in the fuel cell stack (foreign substances remaining in the membrane electrode assembly) may be smoothly discharged to the outside (into the internal space of the heat treatment chamber) through the target fluid inlet/outlet holes and the through-holes. However, since most of the target fluid inlet/outlet holes may be closed by the cover member, it is possible to minimize the situation in which foreign substances floating in the internal space of the heat treatment chamber flow back into the fuel cell stack through the target fluid inlet/outlet holes.

According to an exemplary embodiment of the present disclosure, the fuel cell heat treatment apparatus may include a purge gas supply line connected to the target fluid inlet/outlet holes and configured to supply a purge gas to the target fluid inlet/outlet holes.

As described above, according to an embodiment of the present disclosure, the purge gas supply line may be provided to supply the purge gas into the fuel cell stack, and foreign substances remaining in the fuel cell stack may be pushed out by the purge gas supplied into the fuel cell stack through the target fluid inlet/outlet holes. Therefore, it is possible to obtain an advantageous effect of more effectively discharging the foreign substances remaining in the fuel cell stack to the outside of the fuel cell stack.

According to an exemplary embodiment of the present disclosure, the membrane electrode assembly may include an electrolyte membrane and catalyst electrode layers respectively provided on two opposite surfaces of the electrolyte membrane.

Another exemplary embodiment of the present disclosure provides a fuel cell heat treatment method including preparing a fuel cell stack configured by stacking a plurality of unit cells each comprising a membrane electrode assembly (MEA) and performing heat treatment on the entire fuel cell stack at a preset target temperature in a heat treatment chamber.

According to an exemplary embodiment of the present disclosure, the fuel cell heat treatment method may include fastening the fuel cell stack so that a temporary fastening pressure lower than a preset reference fastening pressure is applied to the unit cells while the heat treatment is performed on the fuel cell stack in the heat treatment chamber.

According to an exemplary embodiment of the present disclosure, the fuel cell stack may include endplates configured to cover ends of the unit cells disposed at outermost peripheries among the plurality of unit cells and having target fluid inlet/outlet holes through which target fluids flow in or out, and the temporary fastening pressure is applied to the endplate.

According to an exemplary embodiment of the present disclosure, in the performing of the heat treatment on the entire fuel cell stack in the heat treatment chamber, the fuel cell stack may be disposed in the heat treatment chamber such that the target fluid inlet/outlet holes are directed in a gravitational direction.

According to an exemplary embodiment of the present disclosure, the target fluid inlet/outlet holes may include at least any one of a reactant gas inlet/outlet hole through which a reactant gas flows in or out and a coolant inlet/outlet hole through which a coolant flows in or out.

According to the fuel cell heat treatment method according to an exemplary embodiment of the present disclosure, a stand may be disposed in the heat treatment chamber, the stand may support the fuel cell stack so that the fuel cell stack is spaced apart from a bottom of the heat treatment chamber, and the stand may support the fuel cell stack such that the target fluid inlet/outlet holes are exposed while the heat treatment is performed on the fuel cell stack in the heat treatment chamber.

According to an exemplary embodiment of the present disclosure, the fuel cell heat treatment method may include an inclined seating portion provided on the stand and configured such that the fuel cell stack is inclinedly seated on the inclined seating portion.

DETAILED DESCRIPTION OF ILLUSTRATIVE EMBODIMENTS

Figure 1:
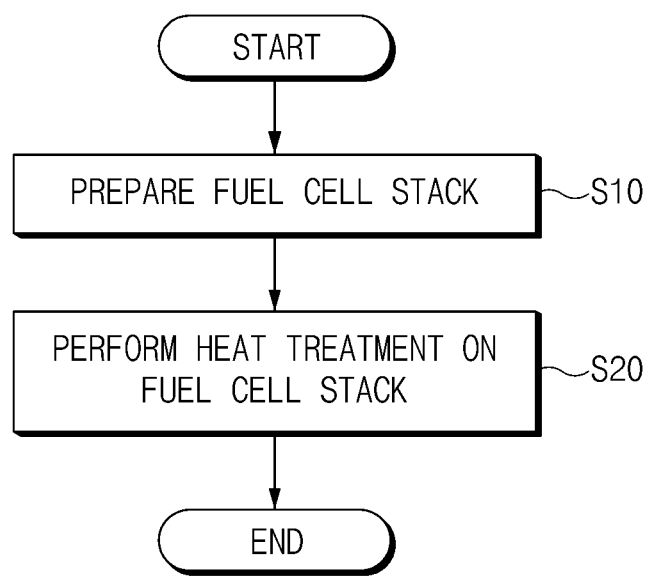
FIG. 1 is a flowchart for explaining a fuel cell heat treatment method according to an embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as having the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 15, a fuel cell heat treatment apparatus 10 according to an embodiment of the present disclosure includes a heat treatment chamber 300 configured to perform heat treatment on a fuel cell stack 100 configured by stacking a plurality of unit cells 110 each including a membrane electrode assembly (MEA) 120. The heat treatment is performed on the entire fuel cell stack 100 in the heat treatment chamber 300 at a preset target temperature.

For reference, the fuel cell stack 100 according to the embodiments of the present disclosure may be applied to various mobility vehicles such as automobiles, ships, and airplanes. The present disclosure is not restricted or limited by the types and properties of subjects (mobility vehicles) to which the fuel cell stack 100 is applied.

Figure 2:
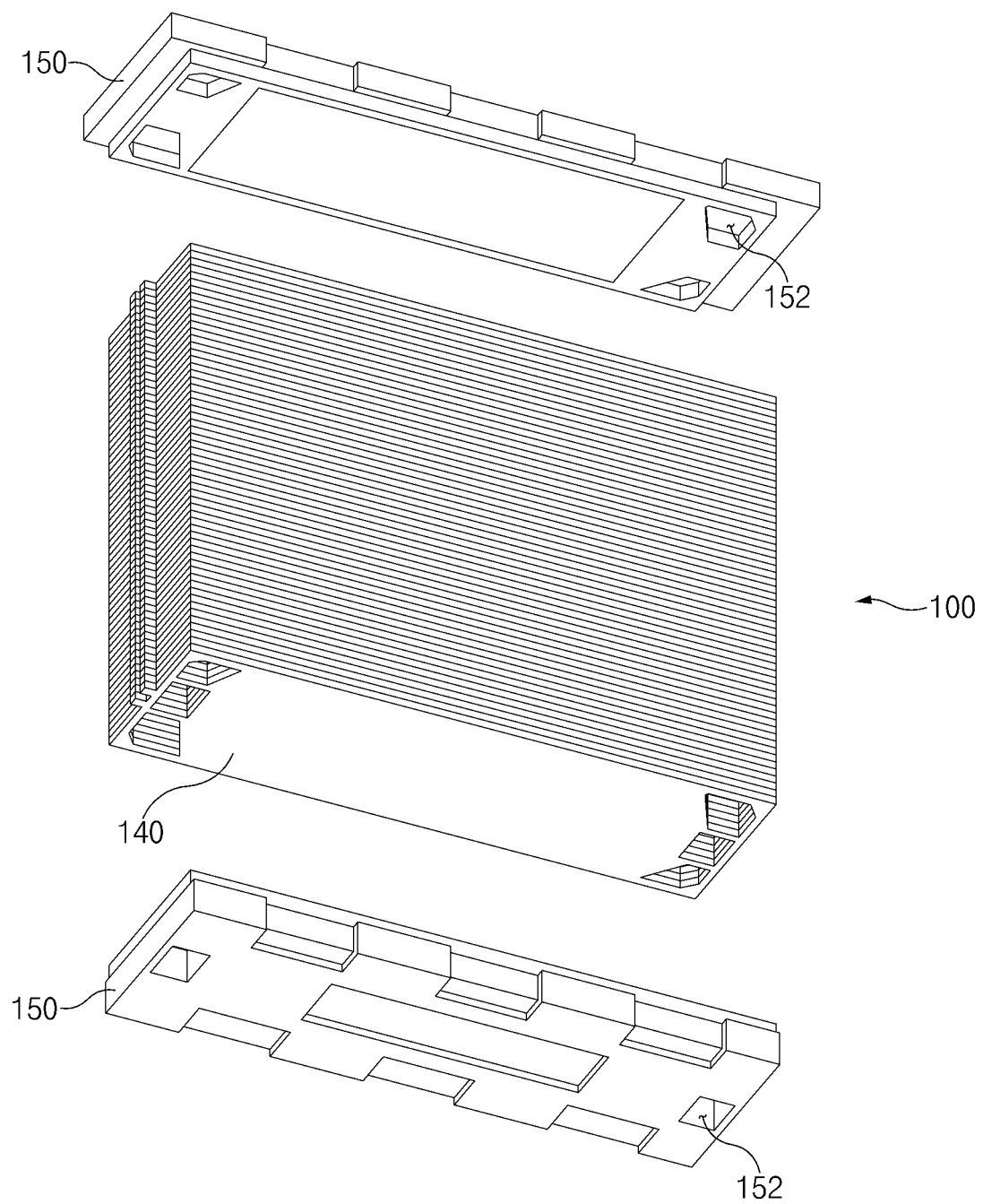
FIG. 2 is a view for explaining a fuel cell stack in a fuel cell heat treatment apparatus according to an embodiment of the present disclosure.
Figure 3:
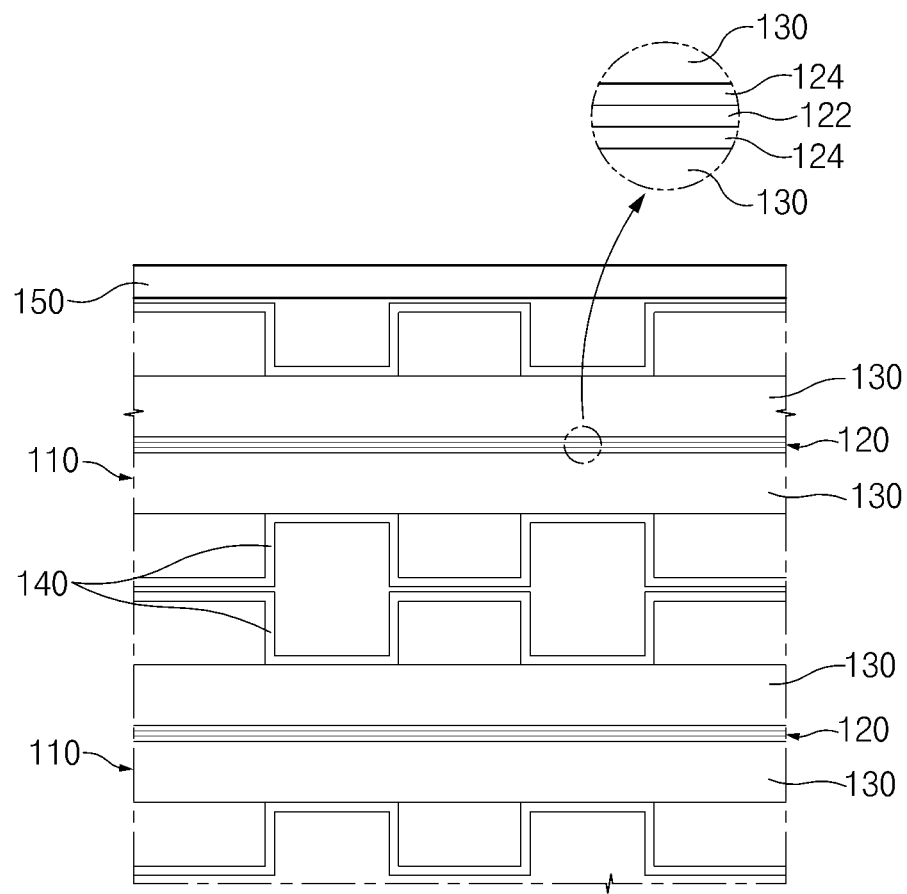
FIG. 3 is a view for explaining a unit cell in the fuel cell heat treatment apparatus according to an embodiment of the present disclosure.

Referring to FIGS. 2 and 3, the fuel cell stack 100 refers to a kind of power generation device that generates electrical energy through a chemical reaction of fuel (e.g., hydrogen), and the reaction unit may be configured by stacking several tens or hundreds of unit cells (fuel cells) 110 in series in a reference stacking direction.

The unit cell 110 may have various structures capable of producing electricity by means of an oxidation-reduction reaction between fuel (e.g., hydrogen) and an oxidant (e.g., reaction air). The present disclosure is not restricted or limited by the structure of the unit cell 110.

The unit cell 110 may have various structures having the membrane electrode assembly (MEA) 120. The present disclosure is not restricted or limited by the structure of the unit cell 110.

According to an exemplary embodiment of the present disclosure, the unit cell 110 may include the membrane electrode assembly (MEA) 120, and separators 140 respectively stacked on two opposite surfaces of the membrane electrode assembly 120.

The membrane electrode assembly (MEA) 120 is configured to produce electricity through an oxidation-reduction reaction between a fuel (e.g., hydrogen), which is a first reactant gas (target fluid), and an oxidant (e.g., air), which is a second reactant gas (target fluid).

The membrane electrode assembly 120 may be variously changed in structure and material in accordance with required conditions and design specifications, and the present disclosure is not limited or restricted by the structure and material of the membrane electrode assembly 120.

For example, the membrane electrode assembly 120 may include an electrolyte membrane through which hydrogen ions move and catalyst electrode layers respectively provided on two opposite surfaces of the electrolyte membrane, and the electrochemical reactions may occur in the catalyst electrode layers.

For reference, the membrane electrode assembly 120 may be manufactured in the form of a roll made by winding a stack in which electrodes (catalyst electrode layers) and gaskets (not illustrated) are sequentially formed on two opposite surfaces of the electrolyte membrane. The membrane electrode assembly 120 may be cut into pieces each corresponding to the unit cell 110 (cut into a size corresponding to the unit cell).

Further, the membrane electrode assembly 120 may be provided in a state (non-heat-treated state) in which no separate heat treatment process is performed on the membrane electrode assembly 120. Alternatively, the fuel cell stack 100 may be made after the membrane electrode assembly 120 is subjected to heat treatment in a separate heat treatment unit (not illustrated). Further, the membrane electrode assembly 120 may be included in the fuel cell stack 100 and subjected to the heat treatment once more in the heat treatment chamber 300 to be described below during a process of performing heat treatment on the fuel cell stack 100.

In addition, gas diffusion layers (GDLs) 130 may be disposed at two opposite sides of the membrane electrode assembly 120. The gas diffusion layers may serve to uniformly distribute the reactant gases (target fluids) and transfer generated electrical energy.

The separator 140 serves not only to block air and hydrogen, which are the target fluids, but also to define flow paths for moving hydrogen, air, and a coolant and to transmit electric current to an external circuit.

In addition, the separator 140 also serves to distribute heat, which is generated in the unit cell 110, to the entire unit cell 110, and the excessively generated heat may be discharged to the outside by a coolant flowing along cooling flow paths (not illustrated) in the separator 140.

The separators 140 are configured to supply the first target fluid (e.g., hydrogen) and the second target fluid (e.g., air) to the membrane electrode assembly 120, and disposed to be in close contact with one surface and the other surface of the membrane electrode assembly 120 in a direction in which the unit cells 110 are stacked.

For example, the separator 140 (e.g., a first separator) disposed on one surface of the membrane electrode assembly 120 may be any one of an anode separator configured to define a flow path for fuel (e.g., hydrogen) which is the first target fluid and a cathode separator configured to define a flow path for an oxidant (e.g., air) which is the second target fluid. Further, the separator 140 (e.g., a second separator) disposed on the other surface of the membrane electrode assembly 120 may be the other of the anode separator and the cathode separator.

For example, the reaction region for the electrochemical reaction of the reactant gas (the region having a first channel or a second channel) may be defined on an approximately central portion of the separator 140 that faces the membrane electrode assembly 120.

For example, the first separator may be in close contact with one surface of the membrane electrode assembly 120. The first channel (not illustrated) through which the first target fluid (e.g., hydrogen) flows may be provided in one surface of the first separator that faces the membrane electrode assembly 120, and a cooling channel (not illustrated) through which the coolant flows may be provided in the other surface of the first separator.

The second separator may be in close contact with the other surface of the membrane electrode assembly 120. The second channel (not illustrated) through which the second target fluid (e.g., air) flows may be provided in one surface of the second separator that faces the membrane electrode assembly 120, and a cooling channel (not illustrated) through which the coolant flows may be provided in the other surface of the second separator.

Hereinafter, an example will be described in which the separator 140 is provided in the form of a thin metal film. Alternatively, the separator may be made of another material such as graphite or a carbon composite.

In addition, the separator 140 may have a plurality of manifold flow paths (not illustrated) through which the target fluids (e.g., hydrogen, air, and the coolant) flow in or out (are supplied or discharged).

For example, a hydrogen inlet manifold flow path (not illustrated) for supplying hydrogen and an air outlet manifold flow path (not illustrated) for discharging air may be disposed at one end of the first separator. A hydrogen outlet manifold flow path (not illustrated) for discharging hydrogen and an air inlet manifold flow path (not illustrated) for supplying air may be disposed at the other end of the first separator.

In contrast, a coolant inlet manifold flow path (not illustrated) for supplying the coolant may be disposed at one end of the second separator, and a coolant outlet manifold flow path (not illustrated) for discharging the coolant may be disposed at the other end of the second separator.

The air supplied to the air inlet manifold flow path may be supplied to the reaction region, perform the reaction, and then be discharged through the air outlet manifold flow path. The hydrogen supplied to the hydrogen inlet manifold flow path may be supplied to the reaction region, perform the reaction, and then be discharged through the hydrogen outlet manifold flow path. In addition, the air supplied to the coolant inlet manifold flow path may pass through the reaction region and then be discharged through the coolant outlet manifold flow path.

The respective manifold flow paths may be variously changed in structures (or types) and shapes in accordance with required conditions and design specifications. The present disclosure is not restricted or limited by the structures and shapes of the manifold flow paths.

For example, each of the manifold flow paths may be penetratively formed in the direction in which the unit cells 110 are stacked and thus have an approximately quadrangular hole shape. Alternatively, each of the manifold flow paths may have a circular cross-sectional shape or other cross-sectional shapes.

According to an exemplary embodiment of the present disclosure, the fuel cell stack 100 may include endplates 150 configured to cover two opposite sides of a reaction unit including the plurality of unit cells 110.

The endplates 150 serve to protect the unit cells 110 from external impact or the like and define outermost peripheral sides of the fuel cell stack 100.

The endplate 150 may have various structures and be made of various materials in accordance with required conditions and design specifications. The present disclosure is not restricted or limited by the structure and material of the endplate 150.

For example, the endplate 150 may be made of a typical metallic material and have a shape corresponding to the unit cell 110. The endplates 150 may cover outer surfaces of the unit cells 110 disposed at the outermost peripheries among the plurality of unit cells 110 that constitutes the reaction unit.

In addition, the endplates 150 have target fluid inlet/outlet holes 152 through which the target fluids flow in or out. The target fluid inlet/outlet holes 152 respectively correspond to the manifold flow paths. The target fluids may flow to the respective manifold flow paths through the target fluid inlet/outlet holes 152.

In this case, the target fluid inlet/outlet hole 152 is defined as including at least any one of reactant gas inlet/outlet holes through which the reactant gases (e.g., hydrogen and air) flow in or out, and coolant inlet/outlet holes through which the coolant flows in or out.

For reference, hydrogen, which is the fuel, and air, which is the oxidant, may be supplied to an anode (not illustrated) and a cathode (not illustrated) of the membrane electrode assembly 120, respectively, through the channels (not illustrated) in the first separator and the second separator. The hydrogen may be supplied to the anode, and the air may be supplied to the cathode.

The hydrogen supplied to the anode is separated into hydrogen ions (protons) and electrons by catalysts in the electrode layers respectively provided on the two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer 130 and the separator 140 which are conductors.

At the cathode, the hydrogen ions supplied through the electrolyte membrane and the electrons transmitted through the separator 140 meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

The heat treatment chamber 300 serves to perform heat treatment on the fuel cell stack 100 at the preset target temperature.

In this case, the process of performing heat treatment on the fuel cell stack 100 means a process of heating the entire (whole) fuel cell stack 100 to a temperature at which foreign substances (e.g., a dispersant or moisture) remaining in the membrane electrode assembly 120 may be removed.

The heat treatment chamber 300 may have various structures capable of performing the heat treatment on the fuel cell stack 100. The present disclosure is not restricted or limited by the type and structure of the heat treatment chamber 300.

For reference, the heat treatment chamber 300 may be configured to simultaneously perform the heat treatment on the plurality of fuel cell stacks 100. In particular, the heat treatment chamber 300 may be configured to perform the heat treatment on all of the plurality of fuel cell stacks 100 within the same temperature range. Alternatively, the heat treatment chamber 300 may be configured to perform the heat treatment on only a single fuel cell stack 100 at one time.

For example, the heat treatment chamber 300 may have a quadrangular box shape having a heat treatment space therein. The heat treatment space may be selectively opened or closed by an opening/closing door (not illustrated).

The heat treatment space of the heat treatment chamber 300 may be perfectly sealed (e.g., in a vacuum state) from the outside. However, the heat treatment space of the heat treatment chamber 300 may not be perfectly sealed as long as the process of performing heat treatment on the fuel cell stack 100 may be performed without problem.

The heat treatment chamber 300 may be variously changed in heat treatment structure (method) and heat treatment temperature in accordance with required conditions and design specifications. The present disclosure is not restricted or limited by the heat treatment structure and heat treatment temperature of the heat treatment chamber 300.

According to an exemplary embodiment of the present disclosure, the fuel cell heat treatment apparatus 10 may include a fastening unit 200 configured to fasten the fuel cell stack 100 so that a temporary fastening pressure HF lower than a preset reference fastening pressure SF is applied to the unit cells 110 during the process of performing heat treatment on the fuel cell stack 100 in the heat treatment chamber 300.

In this case, the reference fastening pressure SF may be understood as a maximum pressing force applied to the unit cells 110 so that the fuel cell stack 100 may have sealability (sealability for the target fluid) that enables the normal operation of the fuel cell stack 100. When the reference fastening pressure SF is applied to the unit cells 110, the respective unit cells 110 may be disposed to be maximally in close contact with one another (at minimum cell pitch intervals).

In contrast, the temporary fastening pressure HF may be understood as a fastening pressure (a fastening pressure lower than the reference fastening pressure) which is temporarily applied to the unit cells 110 only when the heat treatment is performed on the fuel cell stack 100. That is, the temporary fastening pressure HF may be understood as a minimum pressing force applied to the unit cells 110 to the extent that the arrangement state (fastened state) of the respective unit cells 110 may be maintained. When the temporary fastening pressure HF is applied to the unit cells 110, the unit cells 110 may be kept in the arrangement state (fastened state), but intervals between the unit cells 110 may increase (for example, the unit cells 110 may be disposed at maximum cell pitch intervals).

In this case, the reference fastening pressure SF and the temporary fastening pressure HF may be changed in accordance with the specifications of the fuel cell stack 100. The present disclosure is not restricted or limited by the reference fastening pressure SF and the temporary fastening pressure HF.

This is based on the fact that during the process of performing the heat treatment on the fuel cell stack 100, the membrane electrode assembly 120 is heated and the other components (e.g., the separator, the gasket, and the gas diffusion layer), which constitute the fuel cell stack 100, are also heated and expanded simultaneously, and thus a particular component (e.g., the gas diffusion layer) among the components constituting the fuel cell stack 100 may be damaged and deformed in the state in which the respective unit cells 110 are maximally in close contact with one another (the reference fastening pressure is applied) because the components (e.g., the separator and the gas diffusion layer) constituting the fuel cell stack 100 have different coefficients of thermal expansion.

However, according to an embodiment of the present disclosure, during the process of performing the heat treatment on the fuel cell stack 100, the temporary fastening pressure lower than the reference fastening pressure may be applied to the unit cells 110, such that the intervals between the unit cells 110 are increased (the unit cells 110 are disposed at maximum cell pitch intervals). Therefore, it is possible to ensure a sufficient space (interval) in which the components constituting the fuel cell stack 100 may be expanded without being damaged. Therefore, it is possible to obtain an advantageous effect of minimizing deformation and damage caused by the difference in coefficient of thermal expansion between the components.

The fastening unit 200 may have various structures capable of applying the temporary fastening pressure lower than the reference fastening pressure to the unit cells 110. The present disclosure is not restricted or limited by the structure of the fastening unit 200.

Hereinafter, an example will be described in which the temporary fastening pressure is applied to the unit cells 110 through the endplates 150 disposed at outermost peripheral ends of the plurality of unit cells 110. According to another embodiment of the present disclosure, the temporary fastening pressure may be applied directly to the unit cells without the endplates 150.

Figure 4:
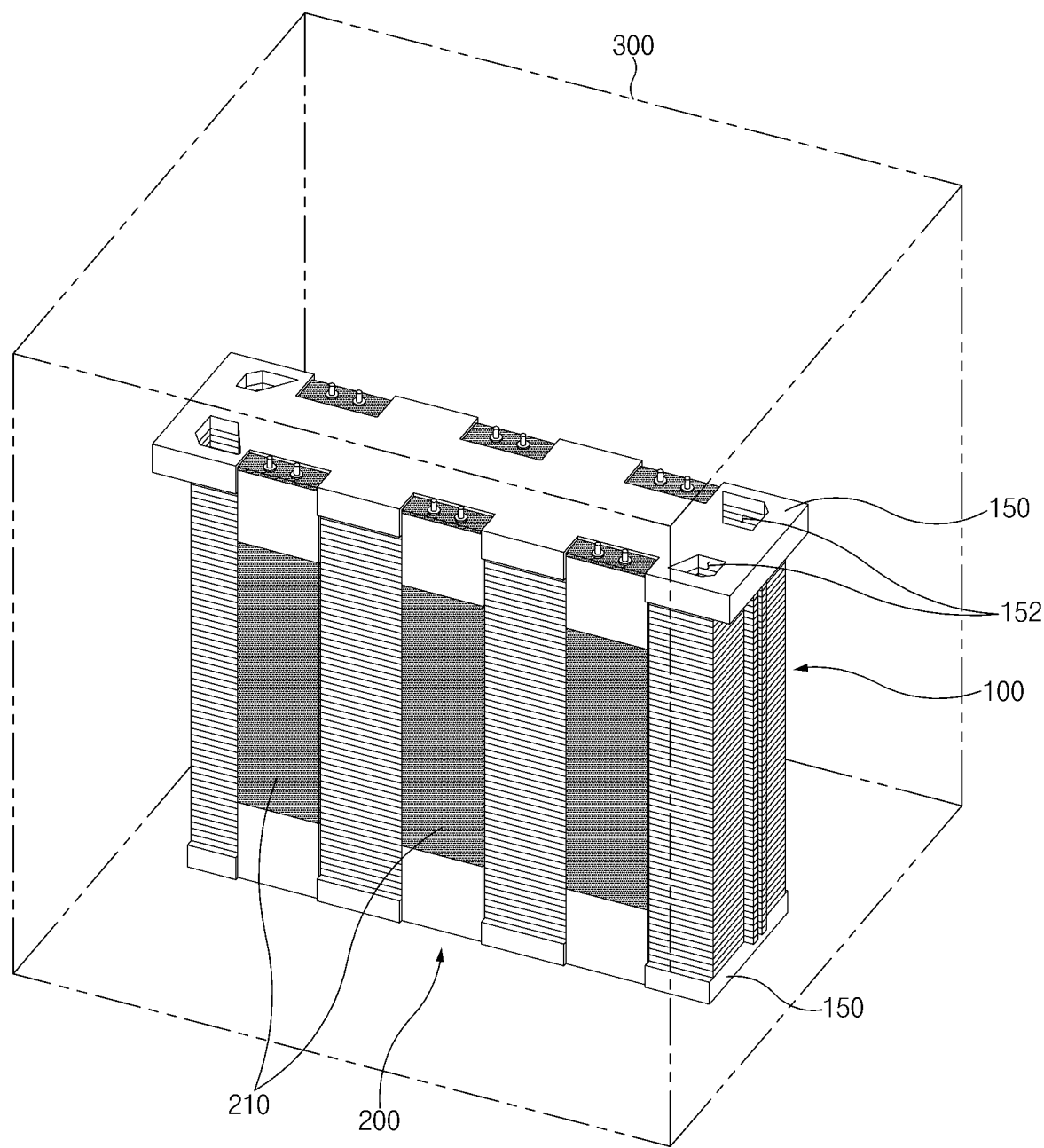
FIG. 4 is a view for explaining the fuel cell heat treatment apparatus according to an embodiment of the present disclosure.
Figure 5:
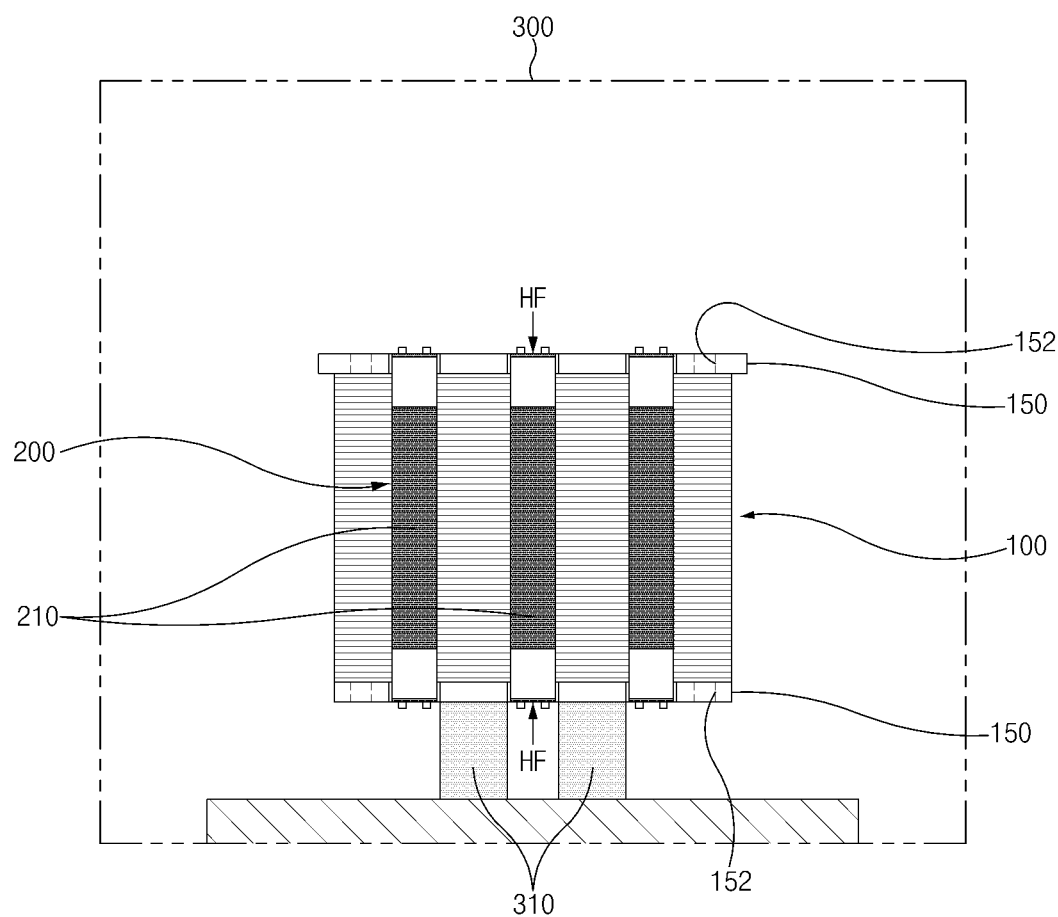
FIG. 5 is a view for explaining a fastening unit of the fuel cell heat treatment apparatus according to an embodiment of the present disclosure.

Referring to FIGS. 4 and 5, according to an exemplary embodiment of the present disclosure, the fastening unit 200 may include clamp members 210 configured to surround a lateral periphery of the unit cells 110 and each having one end (e.g., an upper end based on FIG. 5) and the other end (e.g., a lower end based on FIG. 5) that are respectively locked to the endplates 150.

For example, the clamp member 210 may be provided in the form of a strap (band) made of a metallic material and having an approximately "U" cross-sectional shape. More specifically, a central portion of the clamp member 210 may be disposed to cover the lateral sides of the plurality of unit cells 110. The two opposite ends of the clamp member 210 may be locked to the endplates 150 so as to cover outer surfaces (a top surface and a bottom surface based on FIG. 5) of the endplate 150.

For reference, the temporary fastening pressure implemented by the clamp member 210 may be adjusted by adjusting a length of the clamp member 210 in the direction in which the unit cells 110 are stacked or changing the material and structure of the clamp member 210.

According to an exemplary embodiment of the present disclosure, the fuel cell heat treatment apparatus 10 may include a stand 310 configured to support the fuel cell stack 100 so that the fuel cell stack 100 is spaced apart from the bottom of the heat treatment chamber 300. The stand 310 may support the fuel cell stack 100 so that the target fluid inlet/outlet holes 152 are exposed.

In this case, the configuration in which the stand 310 supports the fuel cell stack 100 so that the target fluid inlet/outlet holes 152 are exposed may be understood as a configuration in which the stand 310 is disposed not to overlap the target fluid inlet/outlet holes 152 such that the target fluid inlet/outlet holes 152 are not closed by the stand 310.

The stand 310 may have various structures capable of supporting the fuel cell stack 100 so that the fuel cell stack 100 is spaced apart from the bottom of the heat treatment chamber 300. The present disclosure is not restricted or limited by the structure and shape of the stand 310.

For example, the stand 310 may have an approximately quadrangular block shape. The stand 310 may be provided in plural, and the plurality of stands 310 may be disposed between the fuel cell stack 100 and the heat treatment chamber 300 and spaced apart from one another. The number of stands 310 and the spacing intervals between the stands 310 may be variously changed in accordance with required conditions and design specifications.

As described above, according to an embodiment of the present disclosure, the stand 310 may allow the fuel cell stack 100 to be spaced apart from the heat treatment chamber 300 without being in close contact with the heat treatment chamber 300, such that the target fluid inlet/outlet holes 152 are kept in an opened state without being closed by the heat treatment chamber 300. Therefore, it is possible to obtain an advantageous effect of stably ensuring efficiency in discharging foreign substances (e.g., a dispersant) through the target fluid inlet/outlet holes 152 during the process of performing heat treatment on the fuel cell stack 100.

Meanwhile, the posture and arrangement structure of the fuel cell stack 100 in the heat treatment chamber 300 may be variously changed in accordance with required conditions and design specifications.

According to an exemplary embodiment of the present disclosure, in a step of performing heat treatment on the fuel cell stack 100 in the heat treatment chamber 300, the fuel cell stack 100 may be disposed in the heat treatment chamber 300 so that the target fluid inlet/outlet holes 152 are directed in a gravitational direction (an upward/downward direction based on FIG. 5).

As described above, according to an embodiment of the present disclosure, the target fluid inlet/outlet holes 152 of the fuel cell stack 100 may be directed in the gravitational direction. Therefore, it is possible to minimize a situation in which the foreign substance (e.g., the dispersant) or the coolant, which is evaporated from the membrane electrode assembly 120, passes through the reaction region (e.g., the first channel or the second channel), and then flows into the manifold flow path, comes into contact with the manifold flow path during the process of performing heat treatment on the fuel cell stack 100. Therefore, it is possible to obtain an advantageous effect of shortening the time required to discharge the foreign substances and the coolant and further improving discharge efficiency.

Figure 6:
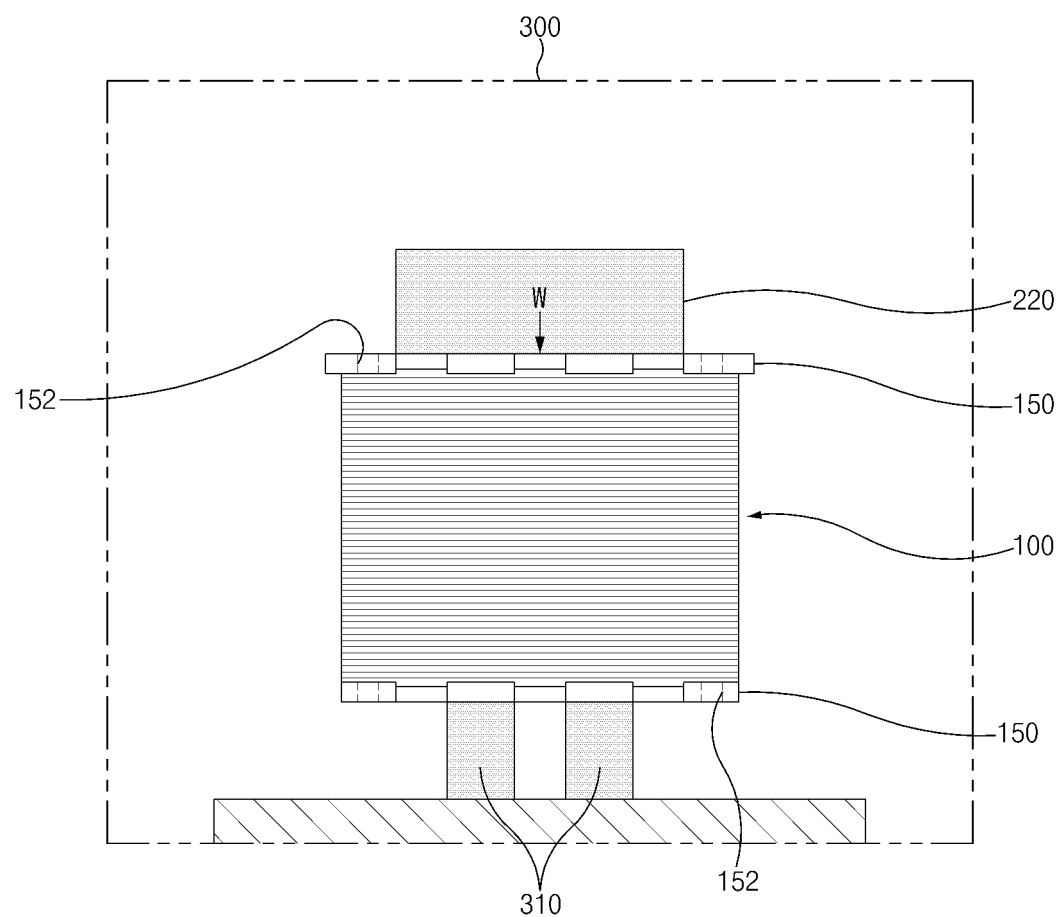
FIG. 6 is a view for explaining another embodiment of the fastening unit of the fuel cell heat treatment apparatus according to an embodiment of the present disclosure.

Referring to FIG. 6, according to another exemplary embodiment of the present disclosure, the fastening unit 200 may include a weight member 220 configured to apply a load W to the endplate 150 in the gravitational direction, and the load W may correspond to the temporary fastening pressure.

The weight member 220 may be disposed at an upper end of the fuel cell stack 100 based on FIG. 6. When the load of the weight member 220 is applied to the endplate 150, the temporary fastening pressure corresponding to the load W of the weight member 220 may be applied to the unit cells 110.

The weight member 220 may have various structures and shapes capable of applying the load W to the endplate 150. The present disclosure is not restricted or limited by the structure and shape of the weight member 220.

For example, the weight member 220 may have an approximately quadrangular block shape.

Figure 7:
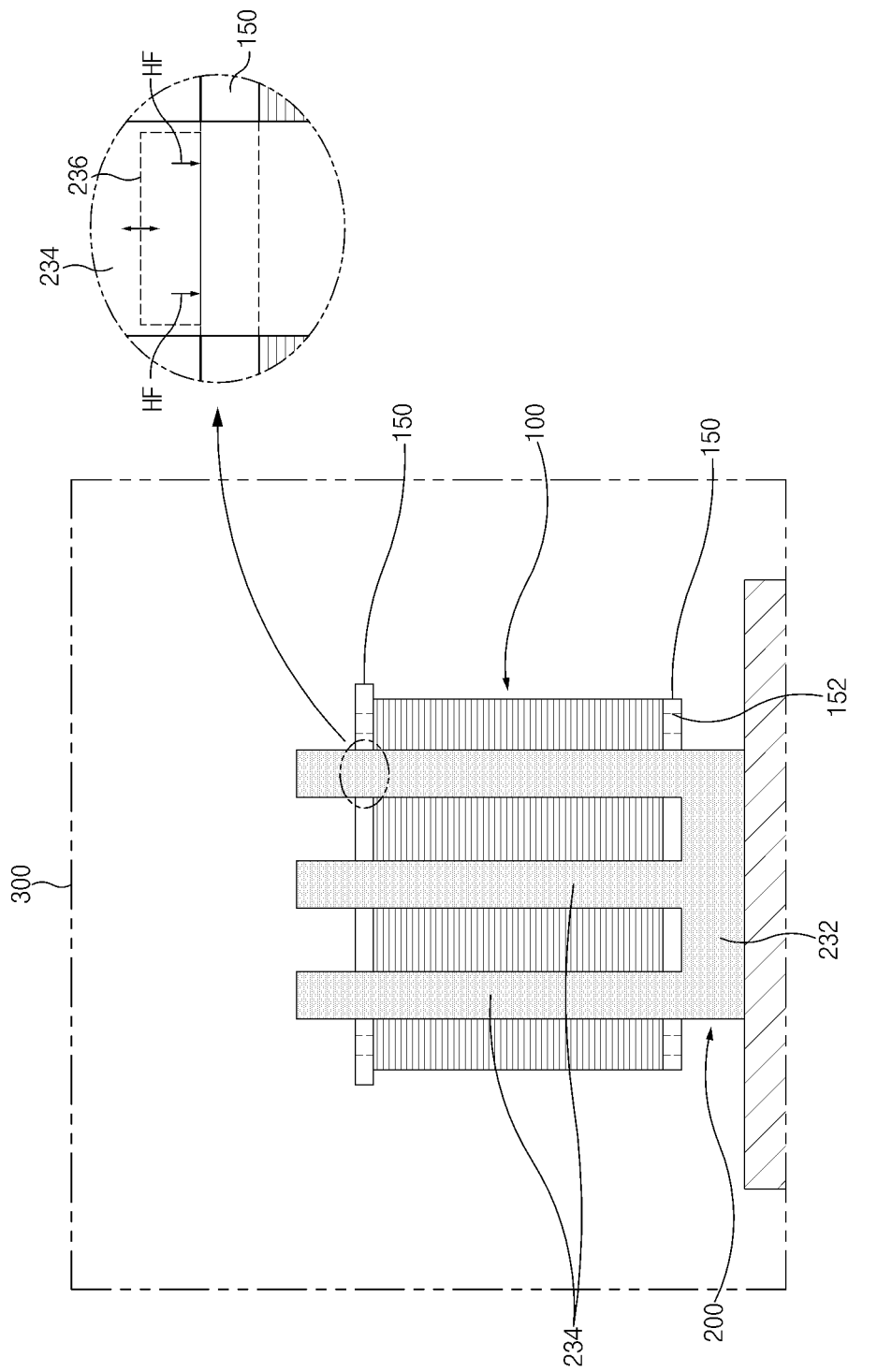
FIGS. 7 to 9 are views for explaining still another embodiment of the fastening unit of the fuel cell heat treatment apparatus according to an embodiment of the present disclosure.
Figure 8:
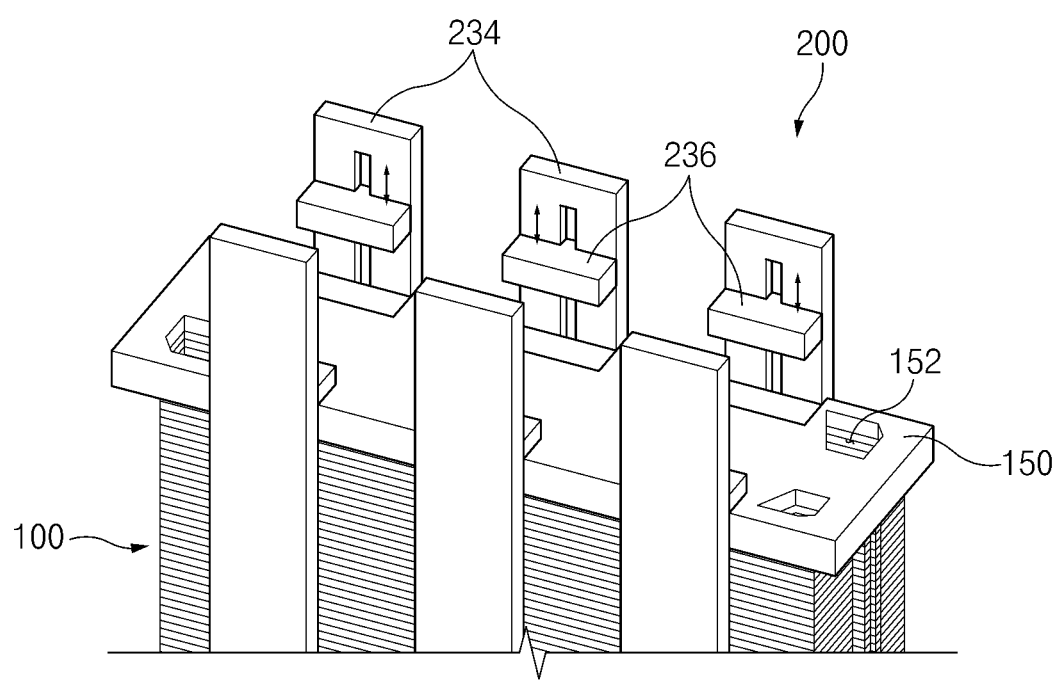
Figure 9:
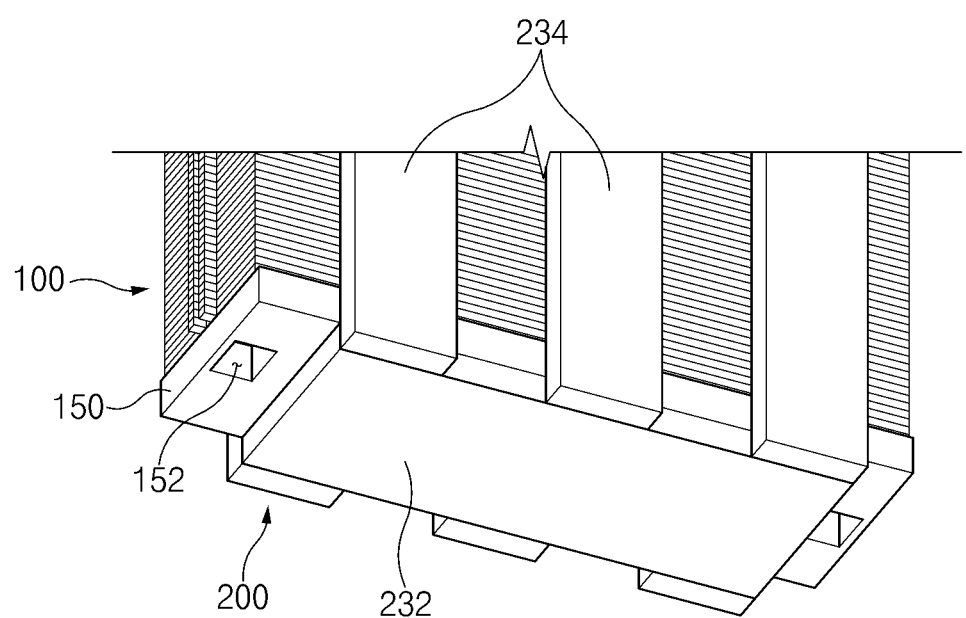

Referring to FIGS. 7 to 9, according to another exemplary embodiment of the present disclosure, the fastening unit 200 may include a support portion 232 configured to support the endplate 150 disposed at one end of the plurality of unit cells 110, guide portions 234 connected to lateral ends of the support portion 232 and configured to guide the lateral sides of the unit cells 110, and pressing portions 236 disposed on the guide portions 234 and configured to be rectilinearly movable in the direction in which the unit cells 110 are stacked, the pressing portions 236 being configured to selectively press the endplate 150 disposed at the other end of the plurality of unit cells 110.

For example, the support portion 232 may support the endplate 150 disposed at the lower end (based on FIG. 7) of the fuel cell stack 100.

The guide portion 234 may have various structures capable of guiding (supporting) the lateral sides of the unit cell 110. The present disclosure is not restricted or limited by the structure and shape of the guide portion 234.

For example, the plurality of (e.g., three) support portions 232 each having a straight shape may be disposed at the lateral ends (e.g., two opposite ends) of the support portion 232 and spaced apart from one another. The plurality of support portions 232 may collectively guide the lateral sides of the unit cells 110.

According to another embodiment of the present disclosure, the support portion 232 may have a curved shape or other shapes. Alternatively, the fastening unit 200 may include two or less support portions 232 or four or more support portions 232.

The pressing portion 236 serves to selectively press the endplate 150 disposed at the upper end (based on FIG. 7) of the fuel cell stack 100.

For example, a guide groove (not illustrated) may be formed in an inner surface of the support portion 232 in the direction in which the unit cells 110 are stacked (the upward/downward direction based on FIG. 8). The pressing portion 236 may rectilinearly move along the guide groove, thereby selectively pressing the endplate 150 disposed at the upper end (based on FIG. 7) of the fuel cell stack 100.

A pressing force (temporary fastening pressure) implemented by the pressing portion 236 may be adjusted by changing a movement distance of the pressing portion 236 relative to the endplate 150 (a height in the upward/downward direction based on FIG. 7). Alternatively, a separate fastening unit 200 may be used to fix (lock) the moved state of the pressing portion 236 relative to the support portion 232.

As described above, according to an embodiment of the present disclosure, the upper surface (based on FIG. 7) of the fuel cell stack 100 may be pressed by the pressing portion 236 in the state in which the bottom surface and the lateral surface (based on FIG. 7) of the fuel cell stack 100 are supported by the support portion 232 and the guide portion 234. Therefore, it is possible to obtain an advantageous effect of more stably maintaining the arrangement state (aligned state) of the unit cells 110 and inhibiting the separation of the unit cells 110 during the process of performing heat treatment on the fuel cell stack 100.

Figure 10:
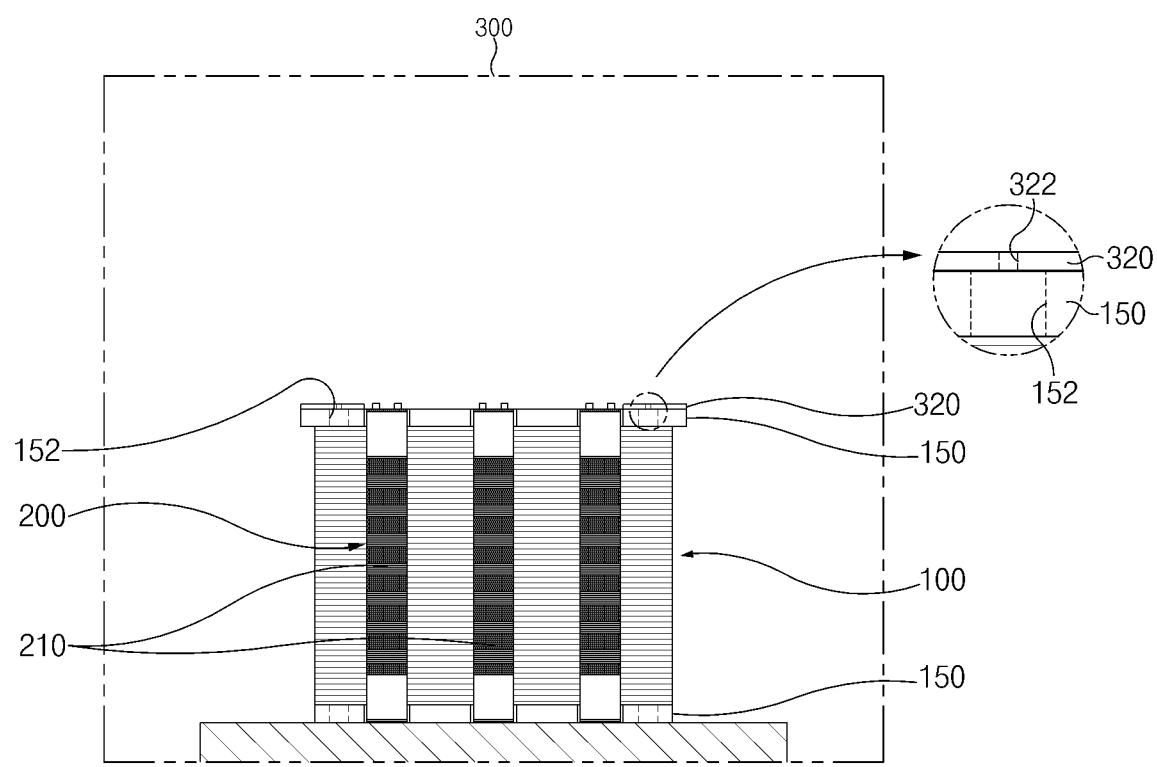
FIGS. 10 and 11 are views for explaining a cover member of the fuel cell heat treatment apparatus according to an embodiment of the present disclosure.
Figure 11:
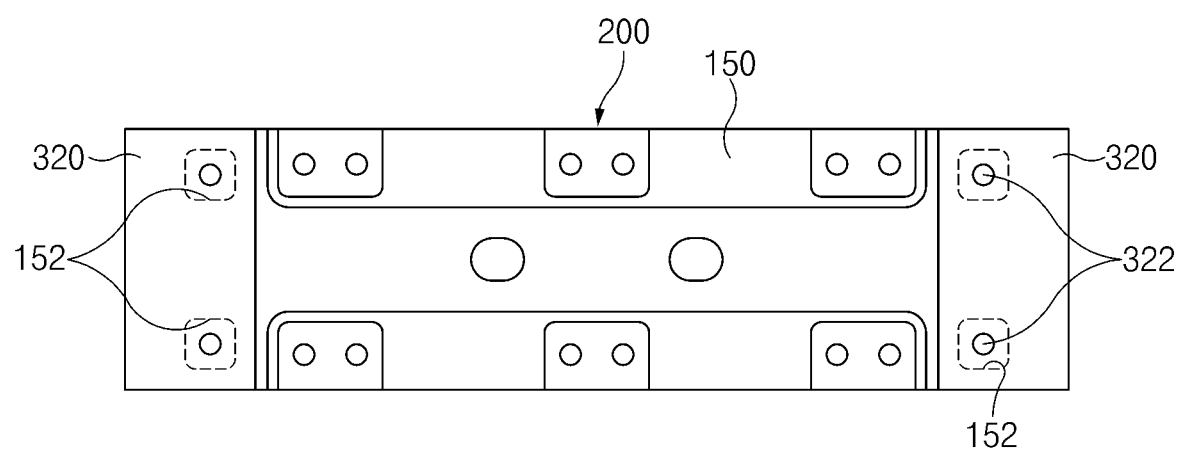

Referring to FIGS. 10 and 11, according to an exemplary embodiment of the present disclosure, the fuel cell heat treatment apparatus 10 may include cover members 320 configured to cover the target fluid inlet/outlet holes 152. The cover member 320 may have through-holes 322 each having a smaller cross-sectional area than the target fluid inlet/outlet hole 152 and configured to communicate with the target fluid inlet/outlet hole 152.

The cover member 320 serves to allow foreign substances to be discharged to the internal space of the heat treatment chamber 300 from the fuel cell stack 100 during the process of performing heat treatment on the fuel cell stack 100 in the heat treatment chamber 300. Further, the cover member 320 serves to minimize a situation in which foreign substances (e.g., the dispersant or moisture) floating in the internal space of the heat treatment chamber 300 flow back into the fuel cell stack 100 through the target fluid inlet/outlet holes 152.

The cover member 320 may have various structures capable of covering the target fluid inlet/outlet holes 152 and each having the through-hole 322 having a smaller cross-sectional area than the target fluid inlet/outlet hole 152. The present disclosure is not restricted or limited by the structure and shape of the cover member 320.

For example, the cover member 320 may be provided in the form of a plate capable of partially covering the outer surface of the endplate 150. The cover member 320 may have the through-hole 322 provided in the form of a circular hole having a smaller cross-sectional area than the target fluid inlet/outlet hole 152.

With the above-mentioned structure, during the process of performing heat treatment on the fuel cell stack 100 in the heat treatment chamber 300, foreign substances remaining in the fuel cell stack 100 (foreign substances remaining in the membrane electrode assembly) may be smoothly discharged to the outside (into the internal space of the heat treatment chamber) through the target fluid inlet/outlet holes 152 and the through-holes 322. However, since most of the target fluid inlet/outlet holes 152 may be closed by the cover member 320, it is possible to minimize the situation in which foreign substances floating in the internal space of the heat treatment chamber 300 flow back into the fuel cell stack 100 through the target fluid inlet/outlet holes 152.

Figure 12:
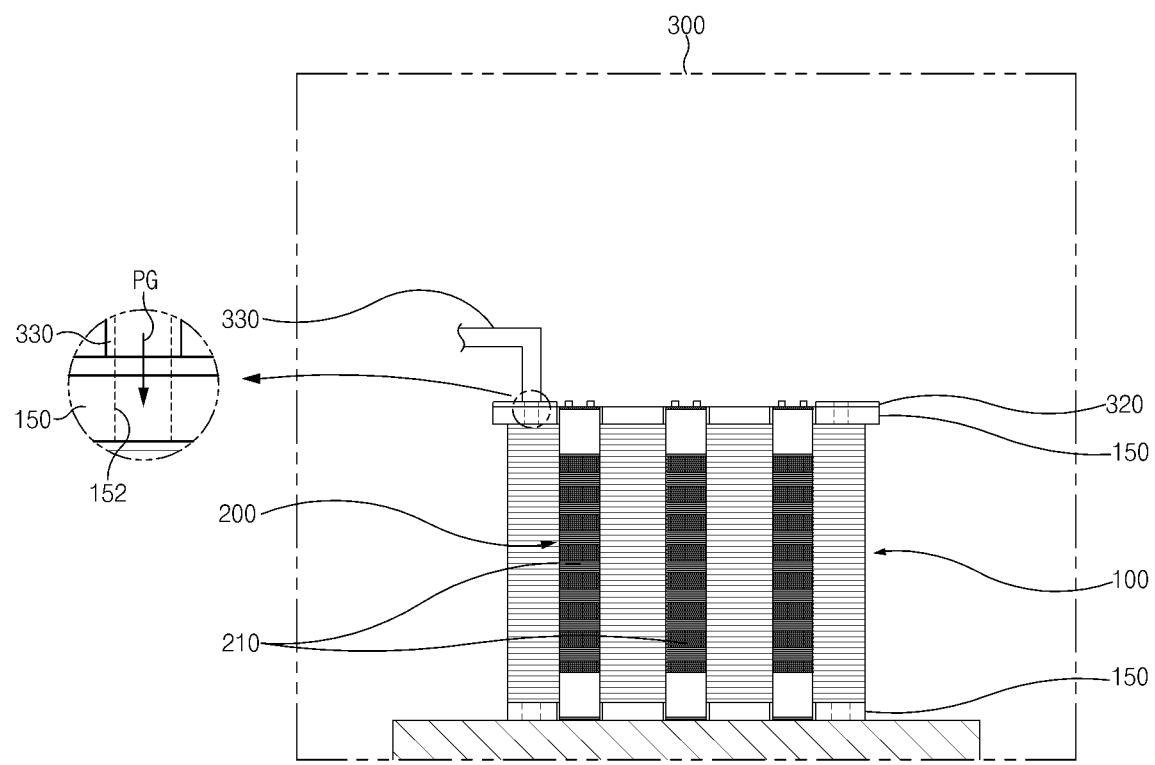
FIGS. 12 and 13 are views for explaining a purge gas supply line of the fuel cell heat treatment apparatus according to an embodiment of the present disclosure.
Figure 13:
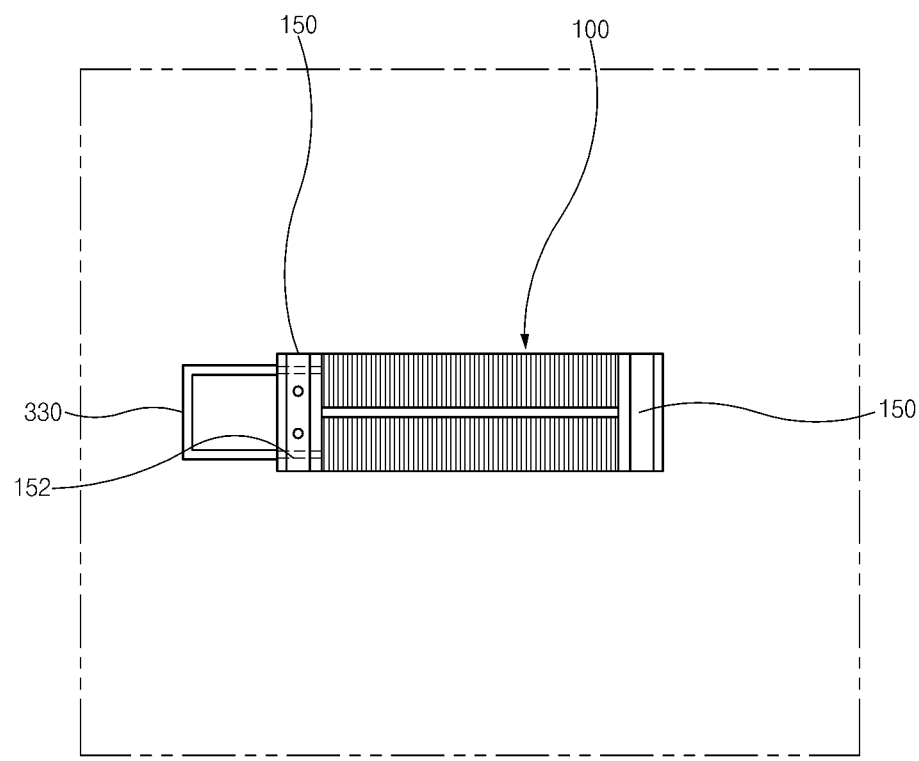

Referring to FIGS. 12 and 13, according to an exemplary embodiment of the present disclosure, the fuel cell heat treatment apparatus 10 may include a purge gas supply line 330 connected to the target fluid inlet/outlet holes 152 and configured to supply a purge gas PG to the target fluid inlet/outlet holes 152.

The purge gas supply line 330 serves to supply the purge gas PG into the fuel cell stack 100 through the target fluid inlet/outlet holes 152.

As described above, according to an embodiment of the present disclosure, the purge gas supply line 330 may be provided to supply the purge gas PG into the fuel cell stack 100, and foreign substances remaining in the fuel cell stack 100 may be pushed out by the purge gas PG supplied into the fuel cell stack 100 through the target fluid inlet/outlet holes 152. Therefore, it is possible to obtain an advantageous effect of more effectively discharging the foreign substances remaining in the fuel cell stack 100 to the outside of the fuel cell stack 100.

Various gases may be used as the purge gas PG in accordance with required conditions and design specifications. The present disclosure is not restricted or limited by the type and properties of the purge gas PG.

In particular, an inert gas (e.g., helium, argon, or nitrogen), which does not react with the fuel cell stack 100, may be used as the purge gas PG.

For reference, the purge gas supply line 330 may be connected to the target fluid inlet/outlet holes 152 of the fuel cell stack 100 regardless of the posture of the fuel cell stack 100.

Referring to FIG. 12, when the fuel cell stack 100 is vertically disposed in the heat treatment chamber 300 (when the target fluid inlet/outlet holes of the fuel cell stack are directed in the gravitational direction), the purge gas supply line 330 may be connected to the upper end (based on FIG. 12) of the fuel cell stack 100.

In contrast, referring to FIG. 13, when the fuel cell stack 100 is horizontally disposed in the heat treatment chamber 300 (when the target fluid inlet/outlet holes of the fuel cell stack are directed in the horizontal direction), the purge gas supply line 330 may be connected to the lateral end (based on FIG. 12) of the fuel cell stack 100.

In an embodiment of the present disclosure illustrated and described above, the example has been described in which the stand 310 configured to support the fuel cell stack 100 in the heat treatment chamber 300 supports the fuel cell stack 100 approximately horizontally. However, according to another embodiment of the present disclosure, the stand 310 may support the fuel cell stack 100 so that the fuel cell stack 100 is inclined.

Figure 14:
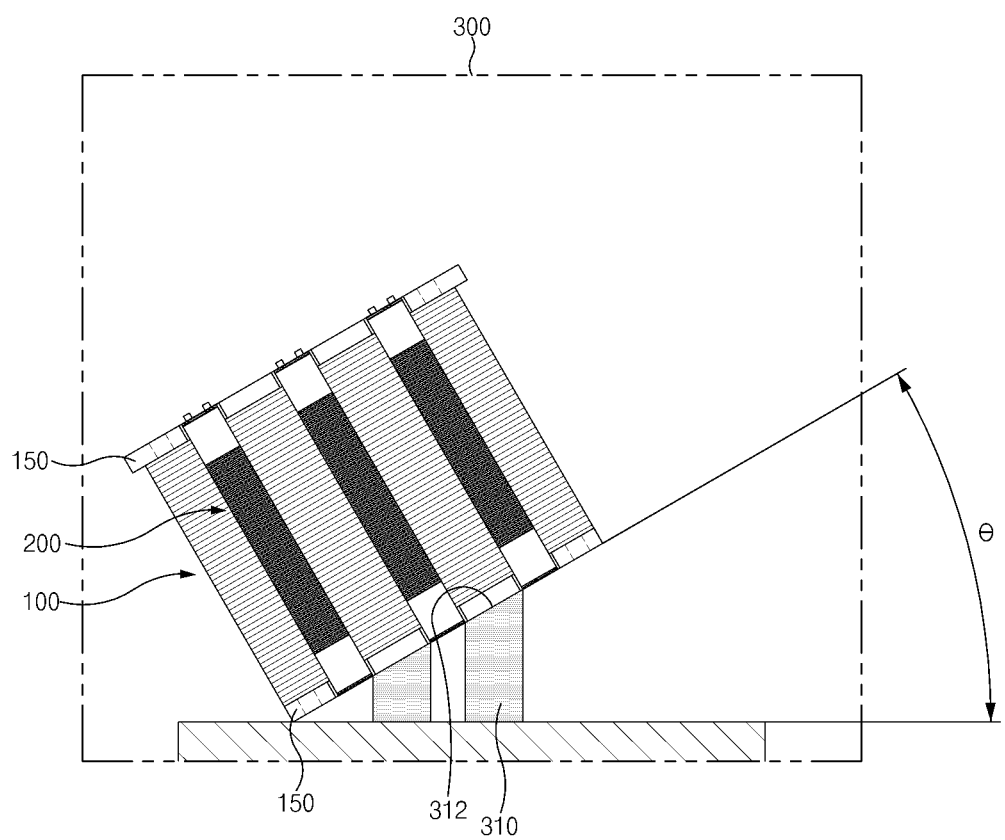
FIG. 14 is a view for explaining a modified example of a stand of the fuel cell heat treatment apparatus according to an embodiment of the present disclosure.

Referring to FIG. 14, according to an exemplary embodiment of the present disclosure, the fuel cell heat treatment apparatus 10 may include an inclined seating portion 312 provided on the stand 310 so that the fuel cell stack 100 is inclinedly seated on the inclined seating portion 312.

The inclined seating portion 312 may be inclined at a predetermined angle θ with respect to the bottom of the heat treatment chamber 300. When the fuel cell stack 100 is seated on the inclined seating portion 312, the fuel cell stack 100 may be disposed to be inclined at the predetermined angle θ with respect to the bottom of the heat treatment chamber 300.

As described above, according to an embodiment of the present disclosure, the fuel cell stack 100 may be disposed to be inclined in the heat treatment chamber 300, such that foreign substances (e.g., the coolant) remaining in the fuel cell stack 100 may naturally flow downward along the inclination of the fuel cell stack 100 (the inclination of the inclined seating portion 312) during the process of performing heat treatment on the fuel cell stack 100. Therefore, it is possible to obtain an advantageous effect of further improving efficiency in discharging foreign substances.

Figure 15:
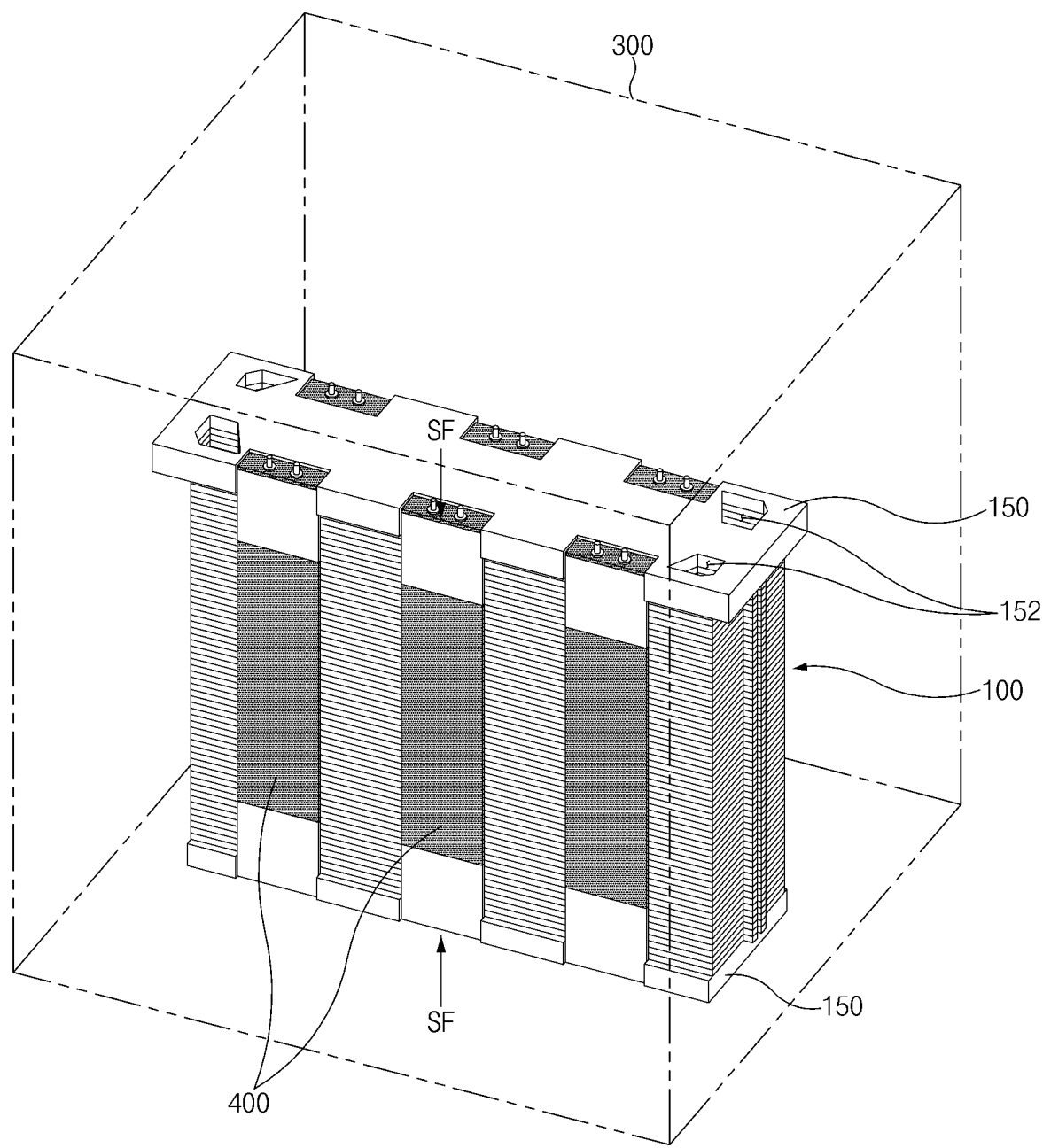
FIG. 15 is a view for explaining a fastening clamp of the fuel cell heat treatment apparatus according to an embodiment of the present disclosure.

Meanwhile, referring to FIG. 15, after the process of performing heat treatment on the fuel cell stack 100 in the heat treatment chamber 300 is completed, the fastening unit 200 may be detached from the fuel cell stack 100, and a fastening clamp 400 capable of applying the reference fastening pressure SF to the unit cells 110 may be fastened to the fuel cell stack 100 again.

The fastening clamp 400 may have various structures capable of applying the reference fastening pressure SF to the unit cells 110. The present disclosure is not restricted or limited by the structure of the fastening clamp 400.

For example, the fastening clamp 400 may have a similar shape to the clamp member 210 and have a shorter length (length in the direction in which the unit cells are stacked) than the clamp member 210.

According to an exemplary embodiment of the present disclosure, the heat treatment chamber 300 may perform additional heat treatment on the fuel cell stack 100 including the membrane electrode assembly 120 that has been subjected to heat treatment in a separate heat treatment unit (not illustrated).

Therefore, when foreign substances (e.g., the dispersant) remain in the membrane electrode assembly 120 included in the fuel cell stack 100, it is possible to regenerate the fuel cell stack 100 (remove foreign substances remaining in the membrane electrode assembly) without disassembling the fuel cell stack 100.

That is, even though the heat treatment process has been performed on the membrane electrode assembly 120, foreign substances may remain in the membrane electrode assembly 120, and the membrane electrode assembly 120, in which foreign substances remain, may be fastened to other components to constitute the fuel cell stack 100.

To regenerate a defective fuel cell stack 100 (the fuel cell stack including the membrane electrode assembly in which foreign substances remain), a defective membrane electrode assembly 120 (the membrane electrode assembly in which foreign substances remain) needs to be replaced (or re-heated). When the fuel cell stack 100 is disassembled again in the state in which the fuel cell stack 100 is completely fastened (assembled), various types of components constituting the fuel cell stack 100 are exposed to the air, which causes degradation. For this reason, there is a problem in that it is difficult to regenerate the defective fuel cell stack 100.

In contrast, according to an embodiment of the present disclosure, the heat treatment may be performed on the entire defective fuel cell stack 100 (the fuel cell stack including the membrane electrode assembly in which foreign substances remain) in the heat treatment chamber 300. Therefore, it is possible to regenerate the defective fuel cell stack 100 without inconvenience of having to disassemble or reassemble the fuel cell stack 100.

Hereinafter, a fuel cell heat treatment method according to an embodiment of the present disclosure will be described.

FIG. 1 is a flowchart for explaining the fuel cell heat treatment method according to an embodiment of the present disclosure. Further, the parts identical and equivalent to the parts in the above-mentioned configuration will be designated by the identical or equivalent reference numerals, and detailed descriptions thereof will be omitted.

Referring to FIGS. 1 to 15, the fuel cell heat treatment method according to an embodiment of the present disclosure includes a step S10 of preparing the fuel cell stack 100 configured by stacking the plurality of unit cells 110 each including the membrane electrode assembly (MEA) 120 and a step S20 of performing heat treatment on the entire fuel cell stack 100 at the preset target temperature in the heat treatment chamber 300.

Step 1:

First, the fuel cell stack 100 configured by stacking the plurality of unit cells 110 each including the membrane electrode assembly (MEA) 120 is prepared (S10).

The fuel cell stack 100 may be configured by stacking several tens or hundreds of unit cells (fuel cells) 110 in series in a reference stacking direction.

For example, the unit cell 110 may include the membrane electrode assembly (MEA) 120, and the separators 140 respectively stacked on the two opposite surfaces of the membrane electrode assembly 120.

The membrane electrode assembly 120 may include the electrolyte membrane through which hydrogen ions move and the catalyst electrode layers respectively provided on the two opposite surfaces of the electrolyte membrane, and the electrochemical reactions may occur in the catalyst electrode layers.

For reference, the membrane electrode assembly 120 may be manufactured in the form of a roll made by winding a stack in which electrodes (catalyst electrode layers) and gaskets (not illustrated) are sequentially formed on two opposite surfaces of the electrolyte membrane. The membrane electrode assembly 120 may be cut into pieces each corresponding to the unit cell 110 (cut into a size corresponding to the unit cell).

Step 2:

Next, the heat treatment is performed on the entire fuel cell stack 100 at the preset target temperature in the heat treatment chamber 300 (S20).

In the step S20 of performing heat treatment on the fuel cell stack 100, the heat treatment may be performed on the entire (whole) fuel cell stack 100 fastened while including the membrane electrode assembly 120 at the preset target temperature in the heat treatment chamber 300.

According to another exemplary embodiment of the present disclosure, the fuel cell heat treatment method may include a step of fastening the fuel cell stack 100 so that the temporary fastening pressure lower than the preset reference fastening pressure is applied to the unit cells 110 during the process of performing heat treatment on the fuel cell stack 100 in the heat treatment chamber 300.

In this case, the reference fastening pressure SF may be understood as a maximum pressing force applied to the unit cells 110 so that the fuel cell stack 100 may have sealability (sealability for the target fluid) that enables the normal operation of the fuel cell stack 100. When the reference fastening pressure SF is applied to the unit cells 110, the respective unit cells 110 may be disposed to be maximally in close contact with one another (at minimum cell pitch intervals).

In contrast, the temporary fastening pressure HF may be understood as a fastening pressure (a fastening pressure lower than the reference fastening pressure) which is temporarily applied to the unit cells 110 only when the heat treatment is performed on the fuel cell stack 100. That is, the temporary fastening pressure HF may be understood as a minimum pressing force applied to the unit cells 110 to the extent that the arrangement state (fastened state) of the respective unit cells 110 may be maintained. When the temporary fastening pressure HF is applied to the unit cells 110, the unit cells 110 may be kept in the arrangement state (fastened state), but intervals between the unit cells 110 may increase (for example, the unit cells 110 may be disposed at maximum cell pitch intervals).

For example, the fuel cell stack 100 may include the endplates 150 configured to cover ends of the unit cells disposed at the outermost peripheries among the plurality of unit cells 110 and having the target fluid inlet/outlet holes 152 through which the target fluids flow in or out. The temporary fastening pressure may be applied to the endplate 150.

In this case, the target fluid inlet/outlet hole 152 is defined as including at least any one of reactant gas inlet/outlet holes through which the reactant gases (e.g., hydrogen and air) flow in or out, and coolant inlet/outlet holes through which the coolant flows in or out.

As described above, according to an embodiment of the present disclosure, during the process of performing the heat treatment on the fuel cell stack 100, the temporary fastening pressure lower than the reference fastening pressure may be applied to the unit cells 110, such that the intervals between the unit cells 110 are increased (the unit cells 110 are disposed at maximum cell pitch intervals). Therefore, it is possible to ensure a sufficient space (interval) in which the components constituting the fuel cell stack 100 may be expanded without being damaged. Therefore, it is possible to obtain an advantageous effect of minimizing deformation and damage caused by the difference in coefficient of thermal expansion between the components.

According to another exemplary embodiment of the present disclosure, in the step S20 of performing heat treatment on the fuel cell stack 100 in the heat treatment chamber 300, the fuel cell stack 100 may be disposed in the heat treatment chamber 300 so that the target fluid inlet/outlet holes 152 are directed in the gravitational direction.

As described above, the target fluid inlet/outlet holes 152 of the fuel cell stack 100 may be directed in the gravitational direction. Therefore, it is possible to minimize a situation in which the foreign substance (e.g., the dispersant) or the coolant, which is evaporated from the membrane electrode assembly 120, passes through the reaction region, and then flows into the manifold flow path, comes into contact with the manifold flow path during the process of performing heat treatment on the fuel cell stack 100. Therefore, it is possible to obtain an advantageous effect of shortening the time required to discharge the foreign substances and the coolant and further improving discharge efficiency.

According to another exemplary embodiment of the present disclosure, the fuel cell heat treatment method may include a step of supplying the purge gas PG to the target fluid inlet/outlet holes 152 during the process of performing heat treatment on the fuel cell stack 100 in the heat treatment chamber 300.

As described above, according to an embodiment of the present disclosure, the purge gas PG may be supplied into the fuel cell stack 100 through the target fluid inlet/outlet holes 152 during the process of performing heat treatment on the fuel cell stack 100 in the heat treatment chamber 300, such that the purge gas PG may push out foreign substances remaining in the fuel cell stack 100. Therefore, it is possible to obtain an advantageous effect of more effectively discharging the foreign substances remaining in the fuel cell stack 100 to the outside of the fuel cell stack 100.

In particular, the stand 310 may have the inclined seating portion 312 on which the fuel cell stack 100 is inclinedly seated.

As described above, according to an embodiment of the present disclosure, the fuel cell stack 100 may be disposed to be inclined in the heat treatment chamber 300 by means of the inclined seating portion 312, such that foreign substances (e.g., the coolant) remaining in the fuel cell stack 100 may naturally flow downward along the inclination of the fuel cell stack 100 (the inclination of the inclined seating portion) during the process of performing heat treatment on the fuel cell stack 100. Therefore, it is possible to obtain an advantageous effect of further improving efficiency in discharging foreign substances.

According to the fuel cell heat treatment method according to an exemplary embodiment of the present disclosure, the stand 310 may be disposed in the heat treatment chamber 300, and the stand 310 may support the fuel cell stack 100 so that the fuel cell stack 100 is spaced apart from the bottom of the heat treatment chamber 300. The stand 310 may support the fuel cell stack 100 so that the target fluid inlet/outlet holes 152 are exposed during the process of performing heat treatment on the fuel cell stack 100 in the heat treatment chamber 300.

As described above, according to an embodiment of the present disclosure, the stand 310 may allow the fuel cell stack 100 to be spaced apart from the heat treatment chamber 300 without being in close contact with the heat treatment chamber 300, such that the target fluid inlet/outlet holes 152 are kept in an opened state without being closed by the heat treatment chamber 300. Therefore, it is possible to obtain an advantageous effect of stably ensuring efficiency in discharging foreign substances (e.g., a dispersant) through the target fluid inlet/outlet holes 152 during the process of performing heat treatment on the fuel cell stack 100.

According to embodiments of the present disclosure described above, it is possible to obtain an advantageous effect of improving durability and reliability and minimizing a defect of the fuel cell and deterioration in performance.

In particular, according to embodiments of the present disclosure, it is possible to obtain an advantageous effect of minimizing the amount of foreign substances remaining in the membrane electrode assembly and improving efficiency in removing foreign substances.

In addition, according to embodiments of the present disclosure, it is possible to obtain an advantageous effect of improving durability and reliability of the membrane electrode assembly and ensuring performance of the fuel cell stack.

In addition, according to embodiments of the present disclosure, it is possible to obtain an advantageous effect of simplifying the process of manufacturing the fuel cell stack and reducing the time and cost required to manufacture the fuel cell stack.

In addition, according to embodiments of the present disclosure, it is possible to effectively remove foreign substances remaining in the membrane electrode assembly without damaging the fuel cell stack.

Among other things, according to embodiments of the present disclosure, it is possible to obtain an advantageous effect of effectively removing foreign substances remaining in the membrane electrode assembly (regenerating a defective fuel cell stack) in the state in which the fuel cell stack is completely assembled without disassembling or reassembling the defective fuel cell stack (the fuel cell stack including the membrane electrode assembly in which foreign substances remain).

While the embodiments have been described above, the embodiments are just illustrative and are not intended to limit the present disclosure. It can be appreciated by those skilled in the art that various modifications and applications, which are not described above, may be made to the present embodiments without departing from the intrinsic features of the present embodiments. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell heat treatment method comprising:
preparing a fuel cell stack by stacking a plurality of unit cells, each unit cell comprising a membrane electrode assembly, wherein the fuel cell stack further comprises endplates covering ends of the unit cells located at outermost peripheries of the plurality of unit cells, the endplates having target fluid inlet/outlet holes through which target fluids are flowable;
performing a heat treatment on an entirety of the fuel cell stack at a preset target temperature in a heat treatment chamber;
fastening the fuel cell stack so that a temporary fastening pressure, lower than a preset reference fastening pressure, is applied to the unit cells while the heat treatment is performed on the fuel cell stack in the heat treatment chamber, wherein the temporary fastening pressure is applied to the endplates; and
covering the target fluid inlet/outlet holes with a cover member, wherein the cover member comprises a through-hole having a smaller cross-sectional area than the target fluid inlet/outlet holes and configured to communicate with the target fluid inlet/outlet holes.

2. The fuel cell heat treatment method of claim 1, wherein while performing the heat treatment on the fuel cell stack in the heat treatment chamber, the fuel cell stack is disposed in the heat treatment chamber such that the target fluid inlet/outlet holes are directed in a gravitational direction.

3. The fuel cell heat treatment method of claim 1, wherein the target fluid inlet/outlet holes comprise a reactant gas inlet/outlet hole through which a reactant gas flows.

4. The fuel cell heat treatment method of claim 1, further comprising supplying a purge gas to the target fluid inlet/outlet holes while performing the heat treatment on the fuel cell stack in the heat treatment chamber.

5. The fuel cell heat treatment method of claim 1, further comprising supporting the fuel cell stack on a stand disposed in the heat treatment chamber such that the fuel cell stack is spaced apart from a bottom of the heat treatment chamber and such that the target fluid inlet/outlet holes are exposed while performing the heat treatment on the fuel cell stack in the heat treatment chamber.

6. The fuel cell heat treatment method of claim 5, further comprising inclinedly seating the fuel cell stack on an inclined seating portion provided on the stand.

7. The fuel cell heat treatment method of claim 1, wherein the target fluid inlet/outlet holes comprise a coolant inlet/outlet hole through which a coolant flows in or out.

8. A fuel cell heat treatment apparatus comprising:
a heat treatment chamber configured to perform a heat treatment on an entirety of a fuel cell stack at a preset target temperature in the heat treatment chamber, the fuel cell stack comprising a plurality of unit cells stacked on each other, each unit cell comprising a membrane electrode assembly, wherein the fuel cell stack comprises endplates covering ends of the unit cells located at outermost peripheries of the plurality of unit cells, the endplates having target fluid inlet/outlet holes configured to allow target fluids to flow in or out;
a fastening unit configured to fasten the fuel cell stack such that a temporary fastening pressure, lower than a preset reference fastening pressure, is applicable to the unit cells while the heat treatment is performed, wherein the endplates are configured to receive the temporary fastening pressure; and
a cover member covering the target fluid inlet/outlet holes, wherein the cover member comprises a through-hole having a smaller cross-sectional area than the target fluid inlet/outlet holes and configured to communicate with the target fluid inlet/outlet holes.

9. The fuel cell heat treatment apparatus of claim 8, wherein the fuel cell stack is disposable in the heat treatment chamber such that the target fluid inlet/outlet holes are directed in a gravitational direction.

10. The fuel cell heat treatment apparatus of claim 8, further comprising a purge gas supply line configured to connect to the target fluid inlet/outlet holes and configured to supply a purge gas to the target fluid inlet/outlet holes.

11. The fuel cell heat treatment apparatus of claim 8, further comprising a stand configured to support the fuel cell stack such that the fuel cell stack is spaced apart from a bottom of the heat treatment chamber and such that the target fluid inlet/outlet holes are exposed.

12. The fuel cell heat treatment apparatus of claim 11, further comprising an inclined seating portion provided on the stand, wherein the fuel cell stack is inclinedly seatable on the inclined seating portion.

13. The fuel cell heat treatment apparatus of claim 8, wherein the fastening unit comprises a clamp member configured to surround peripheries of the unit cells, the clamp member comprising a first end and a second end respectively lockable to the endplates.

14. The fuel cell heat treatment apparatus of claim 8, wherein the fastening unit comprises a weight member configured to apply a load corresponding to the temporary fastening pressure to the endplates in a gravitational direction.

15. The fuel cell heat treatment apparatus of claim 8, wherein the fastening unit comprises:

a support portion configured to support a first one of the endplates;

a guide portion connected to a lateral end of the support portion and configured to guide lateral sides of the unit cells; and a pressing portion disposed on the guide portion and configured to be rectilinearly movable in a direction in which the unit cells are stacked, the pressing portion being configured to selectively press a second one of the endplates.

16. The fuel cell heat treatment apparatus of claim 8, wherein the membrane electrode assembly comprises:

an electrolyte membrane; and catalyst electrode layers respectively provided on two opposite surfaces of the electrolyte membrane.

17. A fuel cell heat treatment apparatus comprising:

a heat treatment chamber configured to perform a heat treatment on an entirety of a fuel cell stack at a preset target temperature in the heat treatment chamber, the fuel cell stack comprising a plurality of unit cells stacked on each other, each unit cell comprising a membrane electrode assembly, wherein the fuel cell stack comprises endplates covering ends of the unit cells located at outermost peripheries of the plurality of unit cells, the endplates having target fluid inlet/outlet holes configured to allow target fluids to flow in or out; and a fastening unit configured to fasten the fuel cell stack such that a temporary fastening pressure, lower than a preset reference fastening pressure, is applicable to the unit cells while the heat treatment is performed, wherein the endplates are configured to receive the temporary fastening pressure, and wherein the fastening unit comprises a clamp member configured to surround peripheries of the unit cells, the clamp member comprising a first end and a second end respectively lockable to the endplates.

18. The fuel cell heat treatment apparatus of claim 17, wherein the fastening unit comprises a weight member configured to apply a load corresponding to the temporary fastening pressure to the endplates in a gravitational direction.

19. The fuel cell heat treatment apparatus of claim 17, wherein the fastening unit comprises:

a support portion configured to support a first one of the endplates;

a guide portion connected to a lateral end of the support portion and configured to guide lateral sides of the unit cells; and a pressing portion disposed on the guide portion and configured to be rectilinearly movable in a direction in which the unit cells are stacked, the pressing portion being configured to selectively press a second one of the endplates.

20. The fuel cell heat treatment apparatus of claim 17, further comprising a purge gas supply line configured to connect to the target fluid inlet/outlet holes and configured to supply a purge gas to the target fluid inlet/outlet holes.

* * * * *